July 31, 1923.
O. P. M. PFAFFENBERGER
1,463,591
LIQUID MEASURING DEVICE
Filed July 14, 1922
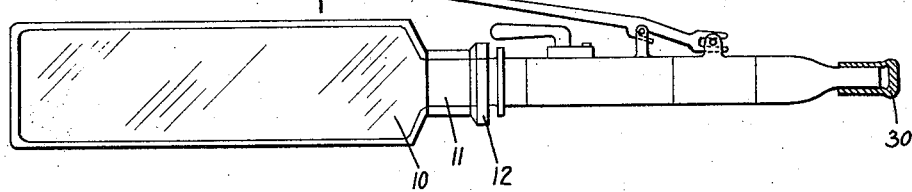
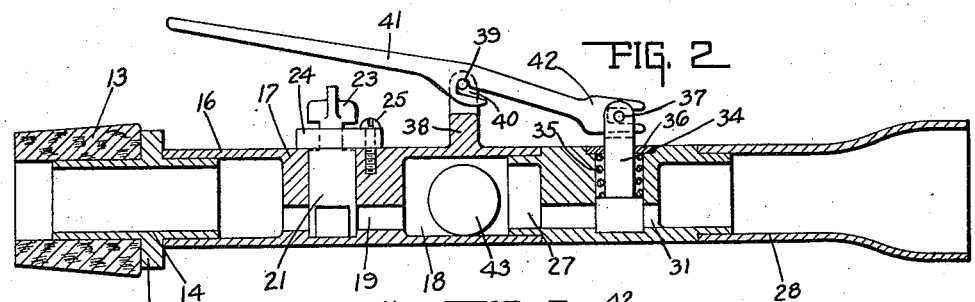
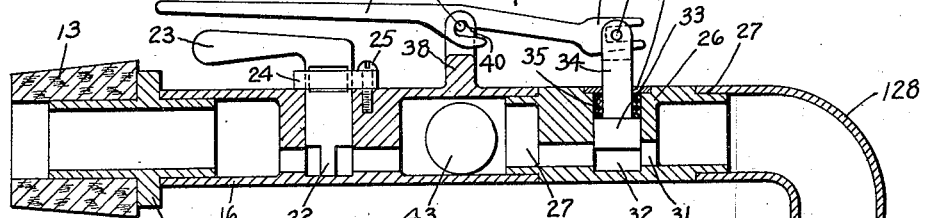
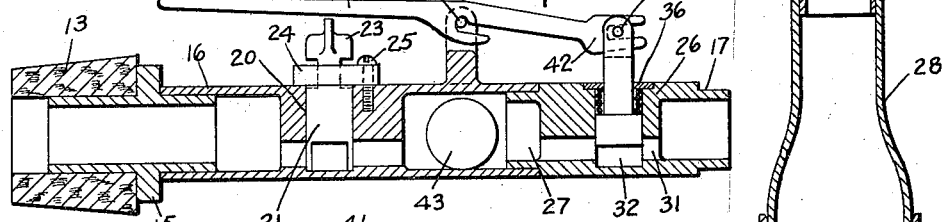
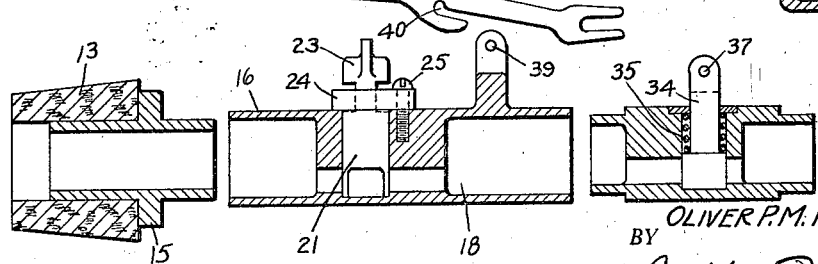
INVENTOR.
OLIVER P.M. PFAFFENBERGER.
BY
Lockwood & Lockwood
ATTORNEYS.

Patented July 31, 1923.

1,463,591

UNITED STATES PATENT OFFICE.

OLIVER P. M. PFAFFENBERGER, OF INDIANAPOLIS, INDIANA.

LIQUID-MEASURING DEVICE.

Application filed July 14, 1922. Serial No. 574,930.

*To all whom it may concern:*

Be it known that I, OLIVER P. M. PFAFFENBERGER, a citizen of the United States, and a resident of Indianapolis, county of Marion and State of Indiana, have invented a certain new and useful Liquid-Measuring Device; and I do hereby declare that the following is a full, clear, and exact description thereof, reference being had to the accompanying drawings, in which like numerals refer to like parts.

This invention relates to a medicine measuring and dispensing device for use with medicine containers.

The chief object of the invention is to provide a device which will not only prevent the free flow of liquid from a container to a dispensing mouthpiece and permit such free flow when desired, but which is also adapted to measure the liquid dispensed.

An equally important object of the invention is to construct the device in such a manner that the parts are readily detachable from each other for cleansing purposes.

The chief features of the invention, in addition to the accomplishment of the foregoing objects, consists in the provision of a mouthpiece which is detachably associated with the measuring device proper or an elbow extension.

Another feature of the invention consists of a cap which is detachably associated with the discharge end of the mouthpiece.

A further feature of the invention consists in the construction of the device such that the same may be adapted to discharge different quantities of liquid.

The full nature of the invention will be understood from the accompanying drawings and the following description and claims.

In the drawings Fig. 1 is a side elevational view of a bottle associated with a measuring device provided with a mouthpiece, in turn provided with a sanitary and protective cap. Fig. 2 is an enlarged longitudinal sectional view of the measuring device with the valves in the filling position and provided with a directly connected mouthpiece. Fig. 3 is a similar view of the same device with the valves in the dispensing position and an elbow extension for the mouthpiece. Fig. 4 is a similar view of the device with both valves in the open position for constant liquid flow. Fig. 5 is a sectional view of the several parts of the device in detached relation preparatory to cleansing.

In the drawings 10 indicates a bottle provided with a neck 11 and a mouth 12 adapted to receive a cork 13 which supports a flanged tube 14 having the flange 15. The flanged tube 14 is adapted to telescopically support one end of a tubular member 17. The tubular member 17 at its opposite end is recessed and provides a chamber 18. A channel 19 connects the tubular end 16 with the chamber forming end 18. The intermediate portion through which the channel 19 extends is transversely recessed as at 20 to support a rotatable valve 21 having the controlling portion 22 which controls the channel 19. Free flow of liquid from the bottle 10 through the channel 19 into the chamber 18 is controlled by the valve 21. The valve 21 is provided with a stem associated with which is a lever handle 23. This valve construction presents a rectangular or flat side for engagement by a spring member 24 secured to the body 17 by suitable means, such as the screw bolt 25. The spring 24 is adapted to maintain the valve 21 in the predetermined position, whether it be fully opened or fully closed, or in an intermediate position.

A tubular member 26 at one end is provided with a chamber forming portion 27 which is telescopically associated with the chamber forming portion 18 of the member 17. The other end of the tubular member 26 is provided with a portion 27 adapted to receive the supporting end of the mouthpiece 28. The mouthpiece 28 is provided with a relatively flat discharge portion 29, and said mouthpiece is adapted to be closed for sanitary reasons by a cap 30. The chamber forming portion 27 discharges into the mouthpiece 28 by means of the channel 31. Transversely of the channel 31 is a recess 32 adapted to receive a valve member 33. The valve member 33 is provided with a stem 34, and concentric with the stem 34 is a spring 35. The spring 35 tends to normally seat the valve 33 in the closed position, thereby closing the communication through the channel 31. A suitable retaining member 36 retains the spring within the transversely extending opening and slidably supports the stem 34. The stem 34 carries a transverse pin 37. Positioned upon and preferably integral with the tubular portion 17 is a pair of ears 38 which support a pin 39. The pin 39 serves as a pivot and is adapted to be received by the L-shaped slot 40 of lever 41. The lever 41 is provided at one end with a slot to form a fork 42 which straddles the pin 37 on the valve stem 34. Pivotal movement of the lever 41 raises or lowers the valve 33 to control the channel 31.

As shown clearly in Fig. 5, the chamber forming portions 27 and 18 are detachably associated together, and said chamber forming portions are adapted to receive one or more volumetric members 43 herein shown in the form of a ball. The volume of the combined chambers 18 and 27 is preferably such that it is adapted to receive one tablespoonful of liquid, and the volume of the ball is preferably equal to that of a teaspoonful of liquid, so that the presence of the ball within the combined chamber reduces the capacity of the chamber from a tablespoonful to a teaspoonful. Other forms of volumetric reducers may be provided and the number and size thereof may be reduced or increased as desired.

Fig. 5 shows the device disassembled, so that each and every part of the device may be readily cleansed.

In Fig. 3 there is illustrated an elbow extension tube 128 which terminates in a formation similar to the end of the tube 27 so that the extension may receive the tubular member 28 shown in Fig. 2, when desired.

From the foregoing it will be noted that the levers 23 and 41 have their actuating portions adjacent each other and very close to the inlet end of the device, so that one hand may grasp the neck of the bottle and support the same and the fingers may manipulate either or both of the levers for liquid control by the device, leaving the other hand free for handling the patient if necessary.

The invention claimed is:

1. In a liquid measuring device, a tubular channel, including a measuring chamber, a plurality of valves for controlling said channel for measuring the flow of liquid, said chamber being arranged to provide access thereto, and a volumetric reducer receivable by said chamber for reducing purposes, but permitting the flow of liquid through said chamber.

2. In a knock-down liquid measuring device, the combination of a plurality of tubular members detachably connected together and formed so as to provide a measuring chamber, a valve positioned in one of said tubular members and controlling the entrance to the chamber, another valve controlling said chamber and supported by another tubular member, and spring means associated with each valve for maintaining said valve in a predetermined position.

3. In a knock-down liquid measuring device, the combination of a plurality of tubular members detachably connected together and formed so as to provide a measuring chamber, a valve positioned in one of said tubular members and controlling the entrance to the chamber, another valve controlling said chamber and supported by another tubular member, a lever detachably supported by one of said elements and adapted to engage and operate the valve in the other element.

4. In a knock-down liquid measuring device, the combination of a plurality of tubular members detachably connected together and formed so as to provide a measuring chamber, a valve positioned in one of said tubular members and controlling the entrance to the chamber, another valve controlling said chamber and supported by another tubular member, a lever detachably supported by one of said elements and adapted to engage and operate the valve in the other element, and spring means associated with each valve for maintaining said valve in a predetermined position.

In witness whereof, I have hereunto affixed my signature.

OLIVER P. M. PFAFFENBERGER.